United States Patent
Krishnamurthy et al.

(10) Patent No.: US 6,304,295 B1
(45) Date of Patent: Oct. 16, 2001

(54) REGION-BASED REFRESH STRATEGY FOR VIDEO COMPRESSION

(75) Inventors: Ravi Krishnamurthy, Plainsboro; Sriram Sethuraman, Hightstown, both of NJ (US)

(73) Assignees: Sarnoff Corporation, Princeton, NJ (US); LG Electronics Inc., Seoul (KR)

(*) Notice: Subject to any disclaimer, the term of this patent is extended or adjusted under 35 U.S.C. 154(b) by 0 days.

(21) Appl. No.: 09/227,520

(22) Filed: Jan. 8, 1999

Related U.S. Application Data

(60) Provisional application No. 60/100,939, filed on Sep. 18, 1998.

(51) Int. Cl.[7] .................................................. H04N 7/12
(52) U.S. Cl. ................................. 348/420.1; 375/240.24
(58) Field of Search ........................... 375/240; 348/699, 348/407.1, 413.1, 416.1, 845.1, 845.2, 466, 419.1, 409.1, 384, 402.1, 423.1, 415.1, 420.1; 395/200.77

(56) References Cited

U.S. PATENT DOCUMENTS

| | | | |
|---|---|---|---|
| 5,136,371 | * 8/1992 | Savatier et al. | 348/409 |
| 5,410,553 | 4/1995 | Choon . | |
| 5,508,743 | 4/1996 | Lizuka . | |
| 5,568,200 | * 10/1996 | Pearlstein et al. | 348/845.1 |
| 5,650,822 | * 7/1997 | Heisler | 348/402.1 |
| 5,726,711 | * 3/1998 | Boyce | 348/409 |
| 5,768,533 | * 7/1998 | Ran | 395/200.77 |
| 5,778,143 | * 7/1998 | Boyce | 348/384 |
| 5,793,895 | * 8/1998 | Chang et al. | 348/407 |
| 5,920,359 | * 7/1999 | Curley et al. | 348/699 |

FOREIGN PATENT DOCUMENTS

| | | |
|---|---|---|
| 0 499 088 A2 | 8/1992 | (EP) . |
| 0 712 252 A1 | 5/1996 | (EP) . |
| 0 935 396 A2 | 8/1999 | (EP) . |

\* cited by examiner

*Primary Examiner*—Chris Kelley
*Assistant Examiner*—Gims Philippe
(74) *Attorney, Agent, or Firm*—William J. Burke

(57) ABSTRACT

Frames in a video sequence are divided into two or more regions and a specified number of macroblocks are selected in each region for intra-coding. Depending on the particular implementation, for one or more of the regions, the intra-macroblocks are selected randomly, while at least one other region is dividing into a specified number of slices with the least-recently intra-coded macroblock in each slice selected for intra-coding. When an error is detected at the decoder, the decoder discards data in the corresponding packet and applies a concealment strategy that involves using motion-compensated data if the motion vectors were accurately decoded; otherwise, using non-motion-compensated reference data for the macroblocks affected by the discarding of data. The refresh strategy of the present invention can be used to provide the resulting encoded bitstream with resilience to transmission errors, while maintaining an acceptable degree of video compression.

16 Claims, 3 Drawing Sheets

REGION-BASED REFRESH STRATEGY FOR VIDEO COMPRESSION

CROSS-REFERENCE TO RELATED APPLICATIONS

This application claims the benefit of the filing date of U.S. provisional application no. 60/100,939, filed on Sep. 18, 1998 as attorney docket no. SAR 12728PROV.

BACKGROUND OF THE INVENTION

1. Field of the Invention

The present invention relates to image processing, and, in particular, to video compression.

2. Description of the Related Art

Video compression is employed to reduce the bandwidth required for transmission or storage. Many standards have evolved for video compression, such as H.261, H.263, H.263+, and the MPEG-1, 2, and 4 standards. These standards use motion compensation and predictive coding where some frames are predicted from reference frames in order to achieve coding efficiency. They also use variable-length codes (VLCs) for the same purpose. While these techniques are excellent from the point of view of compression, in the presence of channel errors, they can cause propagation of errors over a large part of the sequence.

Many tools have been developed to improve the error resilience of compressed video bit streams, such as resynchronization (resync) markers, data partitioning, and reversible VLCs, which are now are part of the MPEG-4 standard.

When channel errors cause the decoder to lose synchronization of a compressed video bitstream that was encoded using VLCs, all the following data up to the next resyne point in the bitstream will be lost. In the normal encoding mode, this resync point will be the start of the next picture. The use of resync markers splits each picture into video packets by explicitly introducing markers in the bit stream and ensuring that there are no dependencies across the packets. Thus, an error in a packet is confined within that packet.

Data partitioning splits the data according to importance. For example, in motion-compensated predictive coding, the motion is usually more important than the residual (i.e., the inter-frame differences after motion compensation) in terms of importance for the perceived quality. If the motion data are placed earlier in the data packet than the residual data, then a channel error that occurs during transmission of the residual data will not affect the more-important motion data. This further increases the resilience of the bitstream in the presence of errors. Reversible VLCs provide additional localization of bit errors.

In all the coding standards, there are intra-coded pictures (I frames) and predictive-coded pictures (P and B frames). In P and B frames, individual macroblocks can be coded in the intra mode, i.e., without dependence on previously decoded information. Intra-coded pictures and macroblocks are excellent from the point of view of error resilience since they avoid the propagation of errors. However, their compression efficiency is very low. Also, in low-delay applications such as video-phone and video-conferencing, intra frames may result in a large frame skip, following which the motion-compensated prediction will not be very effective. Also, the mean frame rate would drop and the motion will become very jerky.

SUMMARY OF THE INVENTION

The present invention is directed to a scheme that adaptively refreshes different regions in the video (according to their relative importance) using intra-coded macroblocks to obtain good compression performance as well as resilience in the presence of errors. According to one embodiment, the present invention is a method for compressing frames of a video sequence, comprising the steps of (a) dividing each frame into two or more regions; (b) selecting one or more macroblocks in each region to be intra-coded; and (c) encoding each frame, wherein the selected macroblocks are intra-coded.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
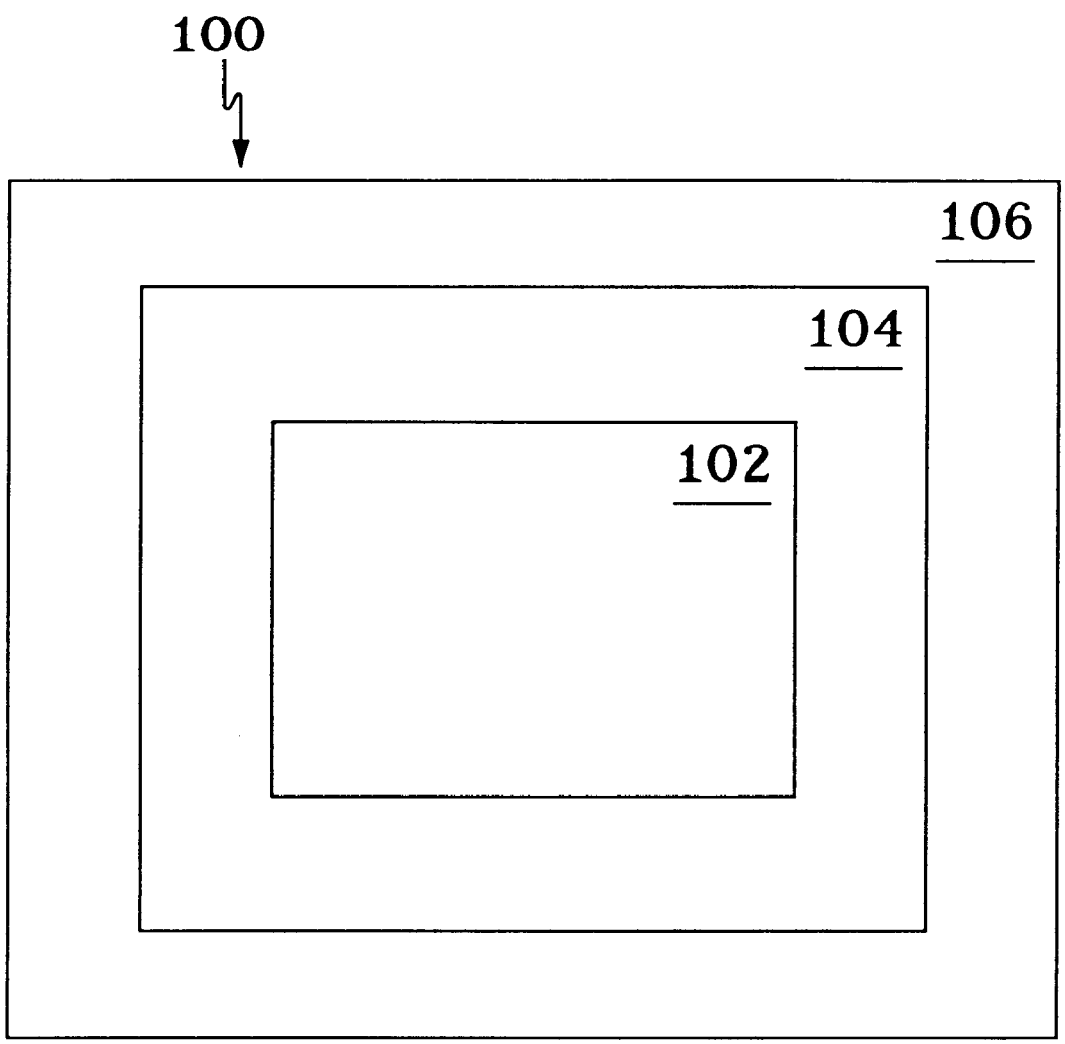
FIG. 1 shows a frame of a video sequence, where the frame has been divided into three regions: a "most-important" region, a "less-important" region, and a "least-important" region.

FIG. 1 shows a frame 100 of a video sequence, where frame 100 has been divided into three regions: a "most-important" region 102, a "less-important" region 104, and a "least-important" region 106. FIG. 1 corresponds to a typical video-conferencing scenario in which a talking person is located at 30 the center of the picture (i.e., foreground region 102), where foreground region 102 is more important to the viewer of the decoded video stream than the background region 106. Region 104 corresponds to a transition region between the foreground region and the background region. Depending on the specific application, the regions can be selected differently, and different numbers of regions can be selected. For example, a picture with two persons may have two most-important foreground regions, two less-important transition regions, and a single least-important background region.

The present invention is directed to a strategy for refreshing different regions in a video sequence using intra-coded macroblocks that takes into account the relative importance of the different regions. The refresh strategy of the present invention may be implemented for the video sequence of frame 100 as follows:

1. For transition region 104 and background region 106, the user selects two numbers N1 and N2 corresponding to the numbers of macroblocks, respectively, that will be intra-coded in these regions for every coded frame. The exact macroblocks to be coded for a particular frame are chosen at random. Eventually, over a long period, all the macroblocks in these regions will be refreshed.

2. In the most-important foreground region 102, the user selects N_SLICE, the number of macroblocks in this region to be intra-coded per frame. The value of N_SLICE depends on how much resilience is to be added to the bitstream at the expense of compression efficiency. The region is then divided into N_SLICE number of slices and one macroblock is intra-coded in each of these slices per coded frame. By keeping track of the last time value at which each macroblock was intra-coded, the macroblock in each slice that was least recently intra-coded is selected for intra-coding in the current frame. Within a slice, ties are resolved by selecting based on some specified rule, e.g., the macroblock furthest to the right in the slice. Optionally, each intra-macroblock can be sent in its own video packet to give additional protection to the bitstream.

Figure 2:
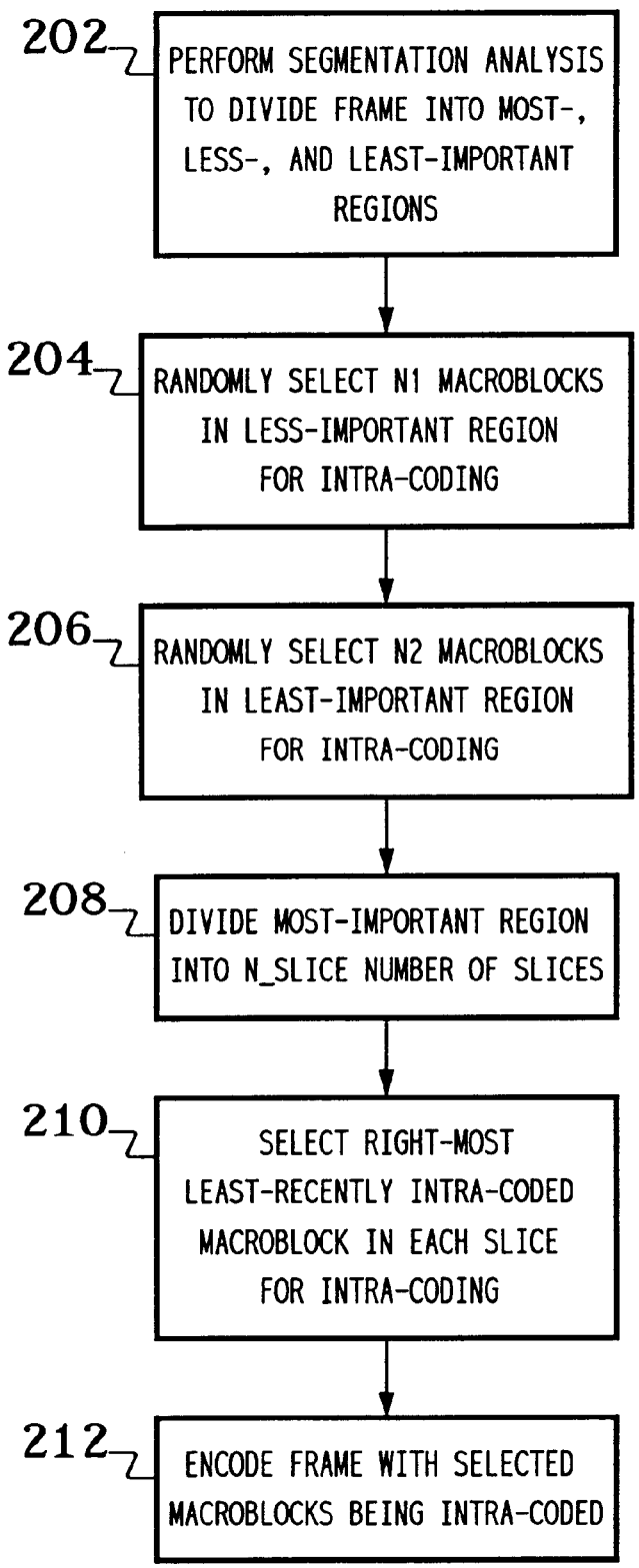
FIG. 2 shows a flow diagram of the processing corresponding to a refresh strategy for the video sequence of the frame of FIG. 1, according to one embodiment of the present invention.

FIG. 2 shows a flow diagram of the encoding processing applied to each coded frame in the video sequence containing frame 100, according to one embodiment of the present invention. The processing begins by dividing the current frame into most-important region 102, less-important region 104, and least-important region 106 (step 202). The analysis of step 202 is referred to as segmentation analysis, which, for purposes of the present invention, can be implemented using any suitable scheme, including automatic schemes or interactive schemes in which the regions of interest are explicitly identified by the user (e.g., a participant in a video-conference located either at the encoder or the decoder). In either case, the segmentation analysis can be performed adaptively throughout the video sequence. As such, the specific macroblocks that constitute the various regions can vary from frame to frame (e.g., as the talking person moves within the field of view).

After the macroblocks of the three regions are identified in step 202, N1 macroblocks are randomly selected in the less-important region 104 for intra-coding (step 204) and N2 macroblocks are randomly selected in the least-important region 106 for intra-coding (step 206). The most-important region 102 is divided into N_SLICE slices (step 208) and the least-recently intra-coded macroblock in each slice is selected for intra-coding (step 210). Note that, if two or more macroblocks in a given slice were equally least-recently intra-coded, then the right-most of those macroblocks in the slice is selected for intra-coding.

After macroblocks have been selected for intra-coding in all of the regions, the frame is encoded, applying an appropriate intra-coding technique to the selected macroblocks (step 212).

Figure 3:
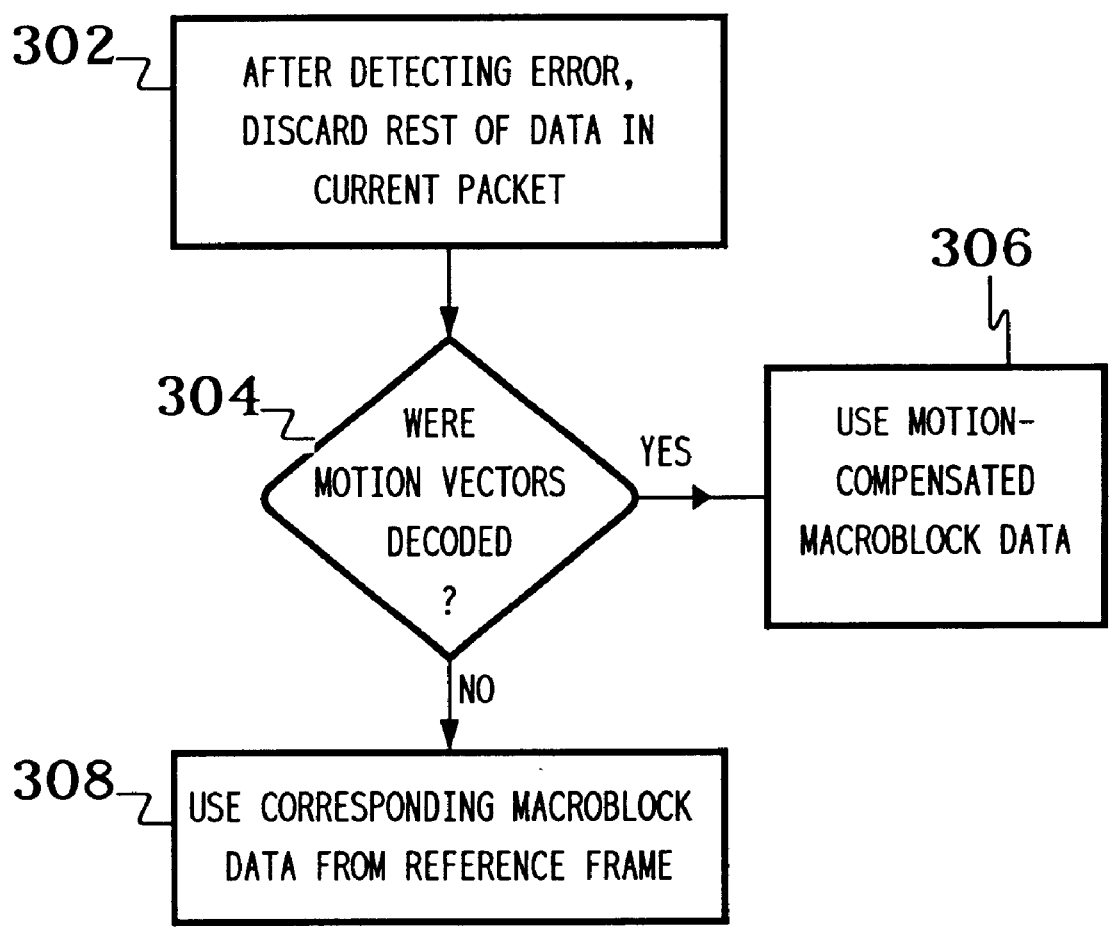
FIG. 3 shows a flow diagram of the processing applied to a frame in an encoded video bitstream that was generated using the encoding processing of FIG. 2, when an error is detected at the decoder, according to one embodiment of the present invention.

FIG. 3 shows a flow diagram of the processing applied to a frame in an encoded video bitstream that was generated using the encoding processing of FIG. 2, when a transmission or other bitstream error is detected at the decoder, according to one embodiment of the present invention. In particular, when the error is detected, the decoder discards all the data in the packet (or, in that partition, if data partitioning is used) (step 302). The decoder then uses a concealment strategy to fill in the missing macroblocks. If the motion vectors were decoded correctly (step 304), the decoder uses the motion-compensated macroblock for concealment (step 306). Otherwise, the decoder treats the missing macroblocks as skipped macroblocks and fills in the corresponding regions with the corresponding macroblocks in the reference frame (step 308). Although this concealment strategy could lead to the propagation of decoding errors over time, the refresh strategy of the present invention reduces this propagation of decoding errors and ensures good video quality even in the presence of transmission errors.

Of course, the present invention can be implemented in a wide variety of alternative embodiments. In general, the present invention is directed to encoding and decoding schemes in which each coded frame in a video sequence is divided into two or more regions, where numbers of macroblocks to be intra-coded in each frame are specified for each region. Exactly how the macroblocks are selected for each different region in each frame can vary from one implementation to another.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for compressing frames of a video sequence, comprising the steps of:
    (a) dividing each frame into two or more regions, each region comprising a plurality of macroblocks;
    (b) selecting one or more macroblocks in each region to be intra-coded, wherein, for each frame, selection of the one or more macroblocks in each region is independent of selection of the one or more macroblocks in every other region of the frame; and
    (c) encoding each frame, wherein the selected macroblocks are intra-coded.

2. The invention of claim 1, wherein, for at least one of the regions, the one or more macroblocks to be intra-coded are selected randomly in the region.

3. The invention of claim 1, wherein, for at least one other of the regions, the region is divided into two or more slices, and a least-recently intra-coded macroblock in each slice is selected for intra-coding for each frame.

4. The invention of claim 3, wherein a specified selection rule is applied if there are two or more least-recently intra-coded macroblocks in a slice.

5. The invention of claim 1, wherein:
    step (a) comprises the step of dividing each frame into a most-important region, a less-important region, and a least-important region; and
    step (b) comprises the steps of:
        (1) randomly selecting a first specified number of macroblocks in the least-important region to be intra-coded;
        (2) randomly selecting a second specified number of macroblocks in the less-important region to be intra-coded; and
        (3) dividing the most-important region into a third specified number of slices and selecting a least-recently intra-coded macroblock in each slice for intra-coding.

6. A computer-readable medium having stored thereon a plurality of instructions, the plurality of instructions including instructions which, when executed by a processor, cause the processor to implement a method for compressing frames of a video sequence, the method comprising the steps of:

(a) dividing each frame into two or more regions, each region comprising a plurality of macroblocks;

(b) selecting one or more macroblocks in each region to be intra-coded, wherein, for each frame, selection of the one or more macroblocks in each region is independent of selection of the one or more macroblocks in every other region of the frame; and (c) encoding each frame, wherein the selected macroblocks are intra-coded.

7. The invention of claim 1, wherein, for at least one of the regions, the one or more macroblocks to be intra-coded are selected randomly in the region.

8. The invention of claim 1, wherein, for at least one other of the regions, the region is divided into two or more slices, and a least-recently intra-coded macroblock in each slice is selected for intra-coding for each frame.

9. The invention of claim 8, wherein a specified selection rule is applied if there are two or more least-recently intra-coded macroblocks in a slice.

10. The invention of claim 1, wherein:

step (a) comprises the step of dividing each frame into a most-important region, a less-important region, and a least-important region; and step (b) comprises the steps of:
(1) randomly selecting a first specified number of macroblocks in the least-important region to be intra-coded;
(2) randomly selecting a second specified number of macroblocks in the less-important region to be intra-coded; and
(3) dividing the most-important region into a third specified number of slices and selecting a least-recently intra-coded macroblock in each slice for intra-coding.

11. A method for decoding a compressed video bitstream, comprising the steps of:

(a) receiving the compressed video bitstream, wherein the compressed video bitstream was encoded by:
(1) dividing each frame into two or more regions, each region comprising a plurality of macroblocks;
(2) selecting one or more macroblocks in each region to be intra-coded, wherein, for each frame, selection of the one or more macroblocks in each region is independent of selection of the one or more macroblocks in every other region of the frame; and
(3) encoding each frame, wherein the selected macroblocks are intra-coded; and (b) decoding the compressed video bitstream, wherein, if an error is detected in a data packet of the compressed video bitstream, then data in the packet are discarded and a concealment strategy is implemented for macroblocks corresponding to the discarded data.

12. The invention of claim 11, wherein the concealment strategy comprises:
(1) using motion-compensated data for the corresponding macroblocks, if motion vectors are accurately decoded; and
(2) using non-motion-compensated reference data for the corresponding macroblocks, if the motion vectors are not accurately decoded.

13. A computer-readable medium having stored thereon a plurality of instructions, the plurality of instructions including instructions which, when executed by a processor, cause the processor to implement a method for decoding a compressed video bitstream, the method comprising the steps of:

(a) receiving the compressed video bitstream, wherein the compressed video bitstream was encoded by:
(1) dividing each frame into two or more regions, each region comprising a plurality of macroblocks;
(2) selecting one or more macroblocks in each region to be intra-coded, wherein, for each frame, selection of the one or more macroblocks in each region is independent of selection of the one or more macroblocks in every other region of the frame; and
(3) encoding each frame, wherein the selected macroblocks are intra-coded; and (b) decoding the compressed video bitstream, wherein, if an error is detected in a data packet of the compressed video bitstream, then data in the packet are discarded and a concealment strategy is implemented for macroblocks corresponding to the discarded data.

14. The invention of claim 13, wherein the concealment strategy comprises:
(1) using motion-compensated data for the corresponding macroblocks, if motion vectors are accurately decoded; and
(2) using non-motion-compensated reference data for the corresponding macroblocks, if the motion vectors are not accurately decoded.

15. The invention of claim 1, wherein each frame is divided into two or more regions based on content of the frame.

16. The invention of claim 6, wherein each frame is divided into two or more regions based on content of the frame.

* * * * *